United States Patent
Ko et al.

(10) Patent No.: US 11,493,594 B2
(45) Date of Patent: Nov. 8, 2022

(54) METHOD AND APPARATUS FOR TDOA WIRELESS POSITIONING USING DESTRUCTIVE INTERFERENCE OF MULTIPLE ANCHOR NODES

(71) Applicant: AJOU UNIVERSITY INDUSTRY-ACADEMIC COOPERATION FOUNDATION, Suwon-si (KR)

(72) Inventors: Young-Bae Ko, Suwon-si (KR); Jiwoong Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 169 days.

(21) Appl. No.: 17/154,145

(22) Filed: Jan. 21, 2021

(65) Prior Publication Data
US 2021/0311160 A1 Oct. 7, 2021

(30) Foreign Application Priority Data
Apr. 6, 2020 (KR) .................. 10-2020-0041312

(51) Int. Cl.
*G01S 5/14* (2006.01)
*G01S 5/02* (2010.01)

(52) U.S. Cl.
CPC ............ *G01S 5/14* (2013.01); *G01S 5/02213* (2020.05)

(58) Field of Classification Search
CPC .................. G01S 5/14; G01S 5/02213
See application file for complete search history.

(56) References Cited

U.S. PATENT DOCUMENTS

2017/0356979 A1* 12/2017 Georgiou ............ G01S 5/0215

FOREIGN PATENT DOCUMENTS

| KR | 10-2001-0064885 A | 7/2001 |
|---|---|---|
| KR | 10-2013-0079183 A | 7/2013 |
| KR | 10-2014-0058983 A | 5/2014 |
| KR | 10-1437921 B1 | 9/2014 |
| KR | 10-1599986 B1 | 3/2016 |
| KR | 10-2018-0081949 A | 7/2018 |
| KR | 10-2018-0083095 A | 7/2018 |

* cited by examiner

*Primary Examiner* — Curtis B Odom
(74) *Attorney, Agent, or Firm* — Sughrue Mion, PLLC (57) ABSTRACT

The present invention relates to a method and apparatus for TDOA wireless positioning, has an effect of reducing positioning errors by reducing TDOA errors using destructive interference of multiple anchor nodes by dividing four or more anchor nodes into sets of three or more anchor nodes and by estimating a position of a tag node using TDOA of each set, and has an advantage of reducing the size and weight of the tag node since separate hardware is not required.

8 Claims, 7 Drawing Sheets

Prior Art

FIG. 1

Prior Art

FIG. 8

METHOD AND APPARATUS FOR TDOA WIRELESS POSITIONING USING DESTRUCTIVE INTERFERENCE OF MULTIPLE ANCHOR NODES

CROSS-REFERENCE TO RELATED APPLICATION

This application claims priority to and the benefit of Korean Patent Application No. 10-2020-0041312, filed on Apr. 6, 2020, the disclosure of which is incorporated herein by reference in its entirety.

TECHNICAL FIELD

The present invention relates to positioning technology for measuring the position of a mobile terminal using wireless communication technology.

BACKGROUND

Indoor positioning technology is a technology that measures the position of a mobile terminal indoors using wireless communication technology. A number of fixed anchor nodes are required for indoor positioning of a mobile terminal (tag node), and the position of the tag node is measured by collecting distance information between each other using signal strength, etc. based on wireless communication. At least 3 anchor nodes are required to measure the position of the tag node on the 2D plane, and at least 4 anchor nodes are required to find the position in the 3D space.

In order to obtain the distance between the tag node and the anchor node, signal strength or time difference of arrival can be used. Among them, the method of using TDOA (Time Difference of Arrival) receives wireless signals broadcasted from a tag node, at an anchor node and find out the position of the tag node using the time difference received at each anchor node.

Figure 1:
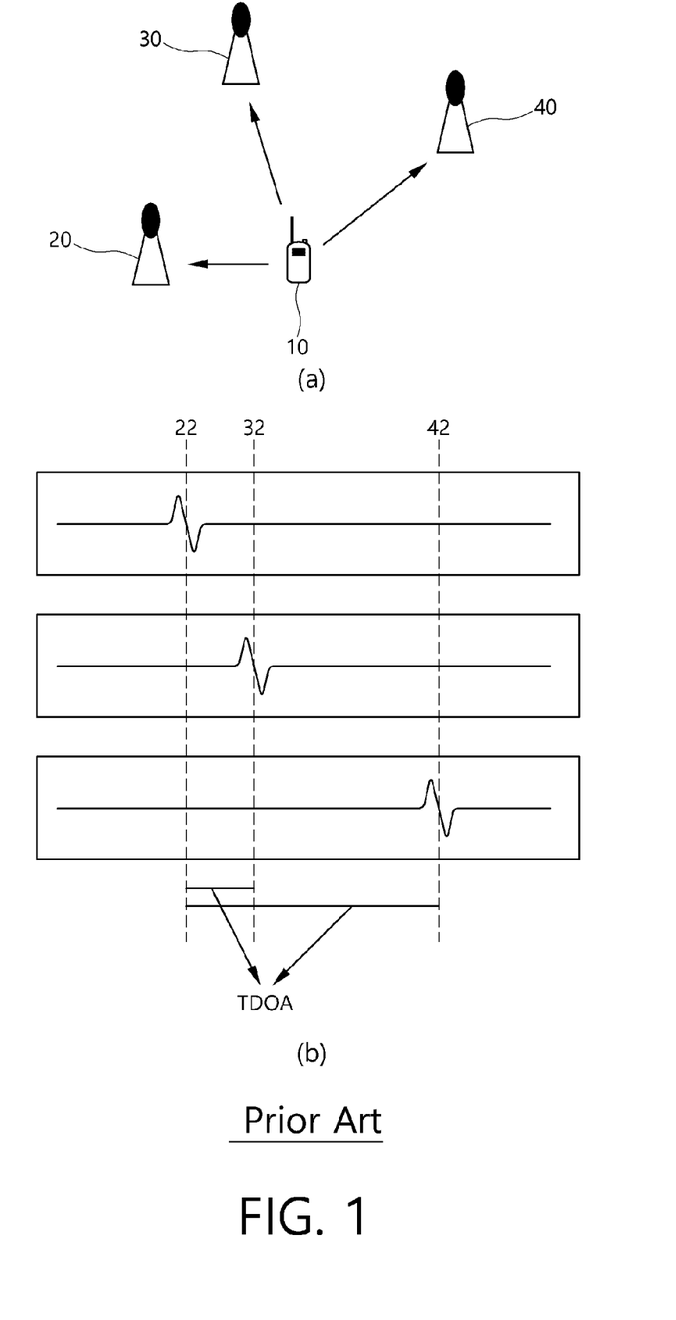
FIG. 1 shows a positioning method using TDOA of prior art.

FIG. 1 is a schematic view of a positioning method using TDOA of prior art.

In (a) of FIG. 1, a tag node 10 transmit signals to anchor nodes 20, 30, and 40. Each of the anchor nodes 20, 30, and 40 receives the signals transmitted from the tag node 10 and calculates the distance by using the time difference.

(b) of FIG. 1 shows the time when the signals transmitted from the tag node 10 arrive to the anchor nodes 20, 30, and 40, respectively. Since the speed of radio wave is the same as the speed of light, the time difference of the signals received by the anchor nodes 20, 30, and 40 may be converted into distance. Since a set of points with a constant distance difference can be expressed as a hyperbolic curve, the position of the tag node can be obtained by constructing multiple hyperbolic curves using the time difference information collected from multiple anchor nodes, and then obtaining an intersection point.

However, the TDOA-based indoor positioning method may cause a problem of deteriorating positioning accuracy due to various factors. The effect is caused by obstacles between the tag node and the anchor node, the mobility of the tag node, interference of wireless communication signals, noise and so on.

In particular, the most influential factor is the error caused by the non-line-of-sight (NLOS) between the anchor node and the tag node.

Figure 2:
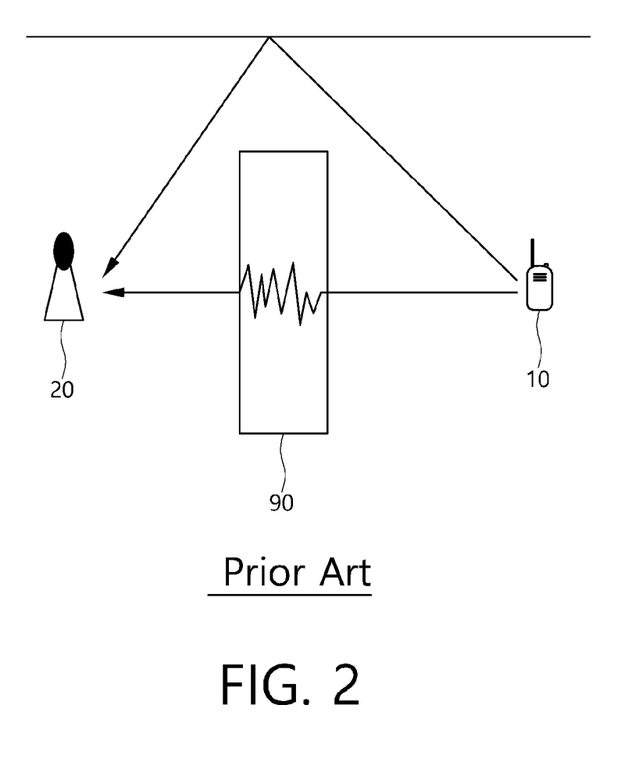
FIG. 2 shows a problem of a positioning method using TDOA of prior art.

FIG. 2 shows an error in a signal path caused by NLOS. Due to an obstacle 90 between the anchor node 20 and the tag node 10, the time for the signal to arrive is prolonged, and the difference in arrival time occurs because indirect waves reflected on the surrounding environment are received together. Therefore, it is calculated longer than the actual distance, and eventually, a problem arises in which the position of the tag node 10 is measured incorrectly.

A typical example of the existing methods for solving the problem of positioning error caused by NLOS between anchor nodes and tag node is a method using channel state information (CSI). CSI is information indicating the state of a wireless channel with various indicators. For example, the CFR (Channel Frequency Response) divides and displays the target frequency band into a plurality of small frequency bands and determines whether a received signal is transmitted as LOS (line-of-sight) or NLOS by comparing the aspect of the received wireless signal for each small frequency. However, since this method requires additional equipment such as multiple antennas to measure CSI, there is a problem of less utilization in application fields where miniaturization and weight lightening of the tag node is essential.

The inventors of the present invention have tried to solve the problems of the positioning method using TDOA of the prior art. The present invention has been completed after much effort to complete a positioning method with high accuracy by removing errors due to obstacles which may occur during TDOA positioning, by destructive interference.

SUMMARY

One aspect of the present invention is intended to minimize positioning errors due to a mobility of a tag node or occurrence of NLOS between the tag node and anchor nodes without additional hardware equipment in providing a TDOA-based wireless indoor positioning technology.

To this end, another aspect of the present invention is intended to minimize an error contained in a wireless signal using the principle of destructive interference by selecting an optimal anchor node pair from multiple anchor nodes.

Meanwhile, other aspects not specified of the present invention will be additionally contemplated within the range that can be easily inferred from the following detailed description and effects thereof.

A server for TDOA wireless positioning using destructive interference according to one embodiment of the present invention includes: a transceiver to receive each reception time of a signal transmitted by a tag node from four or more anchor nodes; and a controller to calculate a position of the tag node using the signal and configured to: calculate TDOA (Time Difference of Arrival) between the anchor nodes using the received times, compose a set including three or more anchor nodes among the anchor nodes, estimate each distance between the tag node and the anchor nodes included in the set, calculate each distance between the tag node and the anchor nodes included in the set using TDOA calculated in the set, calculate a likelihood between the estimated distance and the calculated distance for the each set and calculate a position of the tag node using a set with the highest likelihood.

The estimating each distance between the tag node and the anchor nodes included in the set may use the Chan algorithm.

The estimating each distance between the tag node and the anchor nodes included in the set may use the Gauss-Newton method (iterative substitution method).

In addition, preferably, the calculating the likelihood may use the Maximum Likelihood Estimation method.

A method for TDOA wireless positioning using destructive interference according to another embodiment of the present invention includes calculating TDOA between anchor nodes using respective time when four or more anchor nodes receives a signal transmitted by a tag node; composing a set including three or more anchor nodes among the anchor nodes; estimating each distance between the tag node and the anchor nodes included in the set; calculating each distance between the tag node and the anchor nodes included in the set using TDOA calculated in the set; calculating a likelihood between the estimated distance and the calculated distance for the each set; and calculating a position of the tag node using a set with the highest likelihood calculated.

The estimating each distance between the tag node and the anchor nodes included in the set may use the Chan algorithm.

In addition, the estimating each distance between the tag node and the anchor nodes included in the set may use the Gauss-Newton method (iterative substitution method).

Preferably, the calculating the likelihood may use the Maximum Likelihood Estimation method.

According to embodiments of the present invention, errors caused by the same factors are simultaneously removed in the TDOA calculation process, thereby reducing positioning errors without a special correction process.

In addition, the present invention has an advantage of minimizing the size and weight of the tag node since it is possible to reduce positioning errors caused due to NLOS without separate hardware.

In the meantime, even if there is an effect not explicitly specified herein, it is added that the effects expected by the technical features of the present invention and described effects and provisional effects thereof in the following specification are regarded as described in the specification of the present invention.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

The accompanying drawings are exemplified by reference for understanding the technical idea of the present invention, and the scope of the present invention is not limited thereto.

DETAILED DESCRIPTION OF THE EMBODIMENTS

Hereinafter, a configuration of the present invention guided by various embodiments of the present invention and effects resulting from the configuration will be described with reference to the drawings. In describing the present invention when it is determined that a detailed description of a related known function obvious to those skilled in the art may unnecessarily obscure the subject matter of the present invention, the detailed description thereof will be omitted.

Terms such as 'the first' and 'the second' may be used to describe various elements, but, the above elements should not be limited by the terms above. The terms may only be used to differentiate one element from another. For example, without departing from the scope of the present invention, 'the first element' may be named 'the second element' and similarly, 'the second element' may also be named 'the first element.' In addition, expressions in the singular include plural expressions unless explicitly expressed differently in context. Unless otherwise defined, the terminology used in the embodiments of the present invention may be interpreted as meanings commonly known to those of ordinary skill in the art.

Hereinafter, a configuration of the present invention guided by various embodiments of the present invention and effects resulting from the configuration will be described with reference to the drawings.

Figure 3:
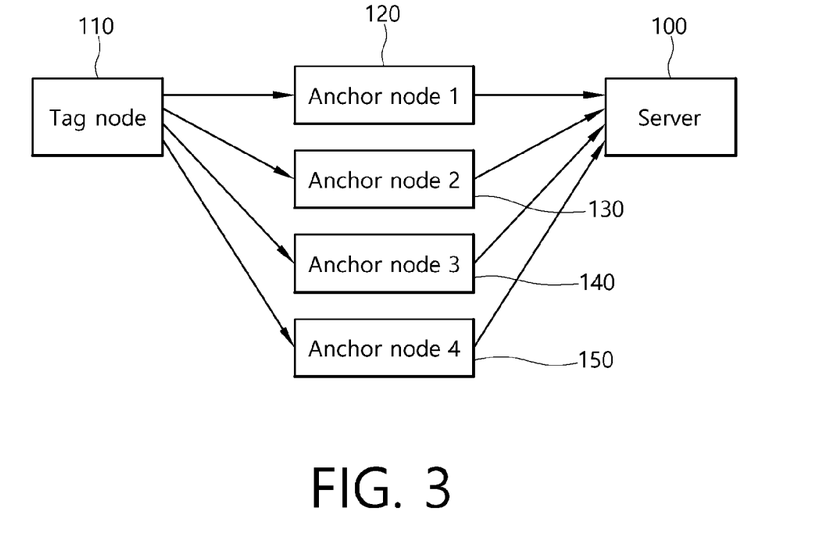
FIG. 3 is a block diagram of an entire system in which a wireless positioning method according to an exemplary embodiment of the present invention is performed.

FIG. 3 is a block diagram of an entire system in which a wireless positioning method according to an embodiment of the present invention is carried out.

Four or more anchor nodes 120, 130, 140, and 150, a tag node 110, and a server 100 are required to carry out the wireless positioning according to an embodiment of the present invention.

When a signal transmitted from the tag node 110 is received by each anchor node 120, 130, 140, and 150, and the received time is transmitted to the server 100, the server uses TDOA to calculate a position of the tag node 110.

Figure 4:
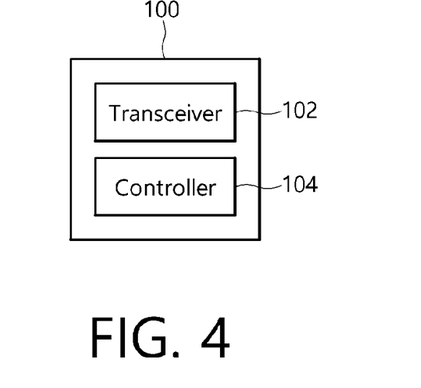
FIG. 4 is a structural diagram of a server in which a wireless positioning method according to an exemplary embodiment of the present invention is performed.

FIG. 4 is a structural diagram of a server for measuring a position of a tag node using TDOA.

The server 100 includes a transceiver 102 and a controller 104.

The transceiver 102 receives time information from each of the anchor nodes 120, 130, 140, and 150 that they received the signal transmitted by the tag node 110.

The controller 104 includes one or more processors and memories, and calculates the position of the tag node 110 using TDOA, which is a difference between signal reception times received from the transceiver 102.

Figure 5:
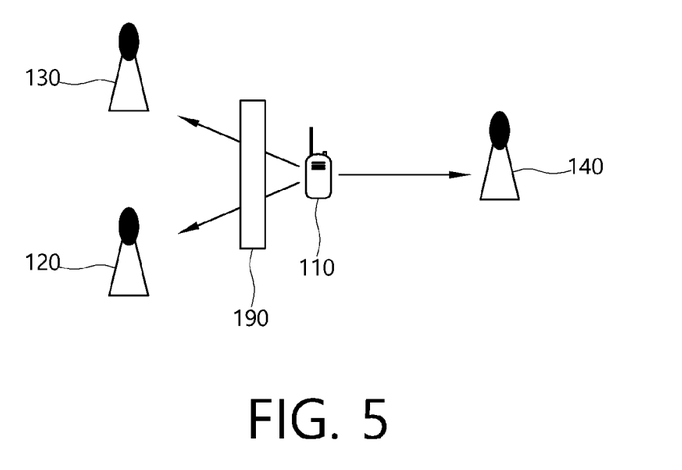
FIG. 5 shows an example of a situation in which a TDOA error occurs due to a same factor.

FIG. 5 shows an example of a situation in which an error may occur in TDOA.

The tag node 110 transmits a signal, and a first anchor node 120, a second anchor node 130, and a third anchor node 140 respectively receive the signal transmitted by the tag node 110. In this case, the first anchor node 120 and the second anchor node 130 are placed on NLOS with the tag node 110 due to an obstacle 190. Therefore, an error occurs in an arrival time when the signal transmitted by the tag node 110 arrives, and when a distance is calculated using this, an error is bound to occur.

Figure 6:
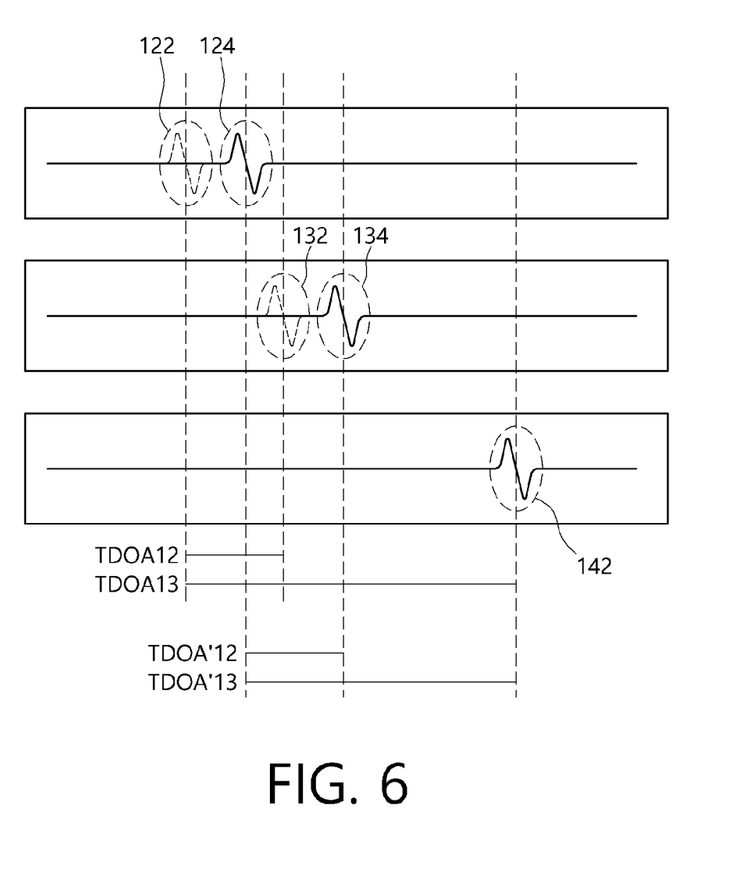
FIG. 6 shows a situation in which an error in signal arrival time occurs in each anchor node due to a same factor.

FIG. 6 shows a situation in which an arrival time of a signal changes due to an obstacle.

It can be seen that T1 122, which is a time supposed to arrive at the first anchor node 120 if there is no obstacle 190, is slowed down to T1' 124 due to the obstacle 190, and T2 132, which is a time supposed to arrive at the second anchor node 130 if there is no obstacle 190, is also slowed down to T2' 134. It can be seen that only T3 142, which is a time of the signal arriving at the third anchor node 140 without the obstacle between the tag node 110 and the third anchor node 140, has normally arrived.

It can be seen the signal arrived at the first anchor node 120 and the signal arrived at the second anchor node 130 are delayed due to the same obstacle over the original time to supposed to arrive, but there is no difference between a time difference TDOA12 (the time difference between the time the signal arrived at the first anchor node 120 and the time the signal arrived at the second anchor node 130) and a time difference TDOA'12. That is, the error generated in the first anchor node 120 and the second anchor node 130 is canceled out by the same factor.

Accordingly, the server 100 may obtain the position of the tag node 110 with a less error due to such a destructive interference phenomenon.

T1' is a time when the signal arrived at the first anchor node 120, and T2' is a time when the signal arrived at the second anchor node 130. Assuming that the arrival times are T1 and T2, respectively if there is no NLOS error, it may be expressed as T1'=T1+E1 and T2'=T2+E2 (E1 and E2 are errors caused by NLOS). It can be seen that since the error is caused by the same obstacle, E1 and E2 can be regarded as the same, therefore, TDOA'12 with error is almost the same as TDOA12 without error like TDOA'12=T2'-T1' T2-T1=TDOA12.

However, TDOA13 and TDOA'13 will be measured differently because the third anchor node (140) does not contain NLOS error.

The prior art estimates the position of the tag node 110 except for the measured values of the first anchor node 120 and the second anchor node 130, where an error occurs due to NLOS, but there is a problem that the accuracy decreases as data that can be used for positioning decreases.

Accordingly, the present invention proposes a method for reducing positioning errors by using destructive interference without excluding anchor nodes that generate such errors.

The server 100 receives time information transmitted from the anchor nodes 120, 130, 140, and 150 through the transceiver 102. For positioning according to the present invention, at least four or more anchor nodes are required unlike the prior art.

The controller 104 of the server 100 calculates TDOAs in all cases by using the received arrival time information. TDOA between anchor node i and anchor node j is calculated as follows: $TDOA_{ij}=|T_i-T_j|$.

Next, in all cases of TDOAs, a set of TDOAs including three or more nodes is composed. If there are four anchor nodes, a set is composed as follows:

$S_1=\{TDOA_{12}, TDOA_{13}\}$ $S_2=\{TDOA_{12}, TDOA_{14}\}$ $S_3=\{TDOA_{23}, TDOA_{24}\}$ $S_4=\{TDOA_{12}, TDOA_{13}, TDOA_{24}\}$

Figure 7:
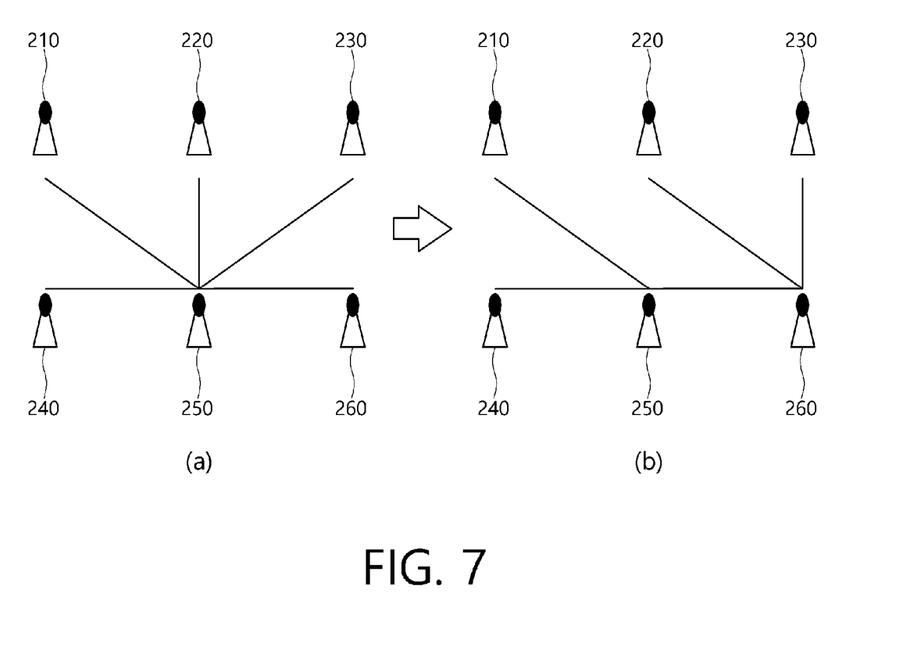
FIG. 7 shows an example of selecting anchor node pairs according to an exemplary embodiment of the present invention.

FIG. 7 shows an example of selecting anchor node pairs. In general, an anchor node pair is selected based on one anchor node as shown in (a) of FIG. 7. (a) of FIG. 7 shows an example of selecting anchor node pairs in order to calculate TDOA between another anchor node based on a fifth anchor node 250.

However, according to an embodiment of the present invention, after calculating TDOA by selecting various anchor node pairs, the position of the tag node may be calculated using the TDOA. (b) of FIG. 7 shows an example of selecting a pair between the fifth anchor node 250 and other anchor nodes or between a sixth anchor node 260 and other anchor nodes according to the present invention.

Now, for every set, a distance $R_i$ between the anchor node and the tag node, respectively is estimated. As for $R_i$, when the distance between the nearest anchor node and the tag node is referred to $R_1$, $R_i$ is estimated by first estimating $R_1$, and then using TDOA between anchor nodes. $R_1$ uses the Chan algorithm, which is a closed form of quadratic equation, so if there is no error in the measured TDOA, it would match the actual distance $R_1$, but there is a difference from the actual $R_1$ since TDOA contains an error.

The Gauss-Newton method (iterative substitution method) may be used to obtain $R_1$.

$R_i$ is estimated by the expansion of the following mathematical equations:

$$P = \begin{bmatrix} x_i - x_1 & y_i - y_1 \\ x_j - x_1 & y_j - y_1 \end{bmatrix}$$

Each of 1, i, and j denotes an anchor node number, and 1 denotes the nearest anchor node that is the basis of TDOA calculation. $[x_n, y_n]$ denotes the position of an n-th anchor node.

$$R=[r_i r_j]^T$$

$r_i$ denotes a TDOA value measured at the i-th anchor node.

$$k_n = x_n^2 + y_n^2$$

$$A = -P^{-1}$$

$$B = \frac{1}{2}\begin{bmatrix} (r_i - r_1)^2 - k_i + k_1 \\ (r_j - r_1)^2 - k_j + k_1 \end{bmatrix}$$

$$E = A \times R = \begin{bmatrix} E_a \\ E_b \end{bmatrix}$$

$$F = A \times B = \begin{bmatrix} F_a \\ F_b \end{bmatrix}$$

By calculating $R_1$, a distance between the nearest anchor node and the tag node using the above equations, the following equation is obtained:

$$R_1^2 = (x_1 - E_a R_1 + F_a))^2 + (y_1 - (E_b R_1 + F_b))^2$$

Since this equation is a theoretically schematized equation of $R_1$, it is necessary to convert it to a quadratic equation for $R_1$ as follows in order to find actual solution of $R_1$:

$$(1-Ea^2-Eb^2)R_1^2 + 2(x_1 E_a + y_1 E_b - EaFa - EbFb)R_1 + 2(x_1 F_a + y_1 F_b) - (F_a^2 + Fb^2) - (x_1^2 + y_1^2) = 0$$

$R_i$ can be calculated by using $R_1$ and TDOA obtained in this way.

Since $R_1$ and $R_i$ are estimated values calculated by the equations, and $R'_i$ calculated based on the position of the tag node calculated through the positioning algorithm includes a TDOA measurement error, between the two is an error proportional to the square of the TDOA measurement error.

An equation for obtaining $R'_i$ is as follows:

$$R'i = (x_i - x)^2 + (y_i - y)^2$$

$x_i$ and $y_i$ denote the position of the i-th anchor node, and x and y denote the position of the tag node.

Finally, the likelihood between $R_i$ estimated by the equation and $R'_i$ obtained using the measured TDOA is obtained by using the Maximum Likelihood Estimation (MLE) method.

$$\text{likelihood} = \frac{1}{\exp\left(\frac{\sum |R_i^2 - R_i'^2|}{n}\right)}$$

n is a total number of anchor nodes in the set.

A TDOA set with the highest likelihood value calculated will be a pair of anchor nodes with the least error or canceled error, and thus the position of the tag node may be calculated as follows:

$$\begin{bmatrix} T_x \\ T_y \end{bmatrix} = -\begin{bmatrix} x_j - x_i & y_j - y_i \\ x_k - x_i & y_k - y_i \end{bmatrix}^{-1} \times \left( \begin{bmatrix} R_i \\ R_j \end{bmatrix} R_i + \frac{1}{2} \begin{bmatrix} R_j - K_j + K_i \\ R_k - K_k + K_i \end{bmatrix} \right)$$

$[T_x, T_y]$ denotes a position of the tag node, and i, j, and k denote the numbers of the i-th, j-th, and k-th anchor nodes.

Figure 8:
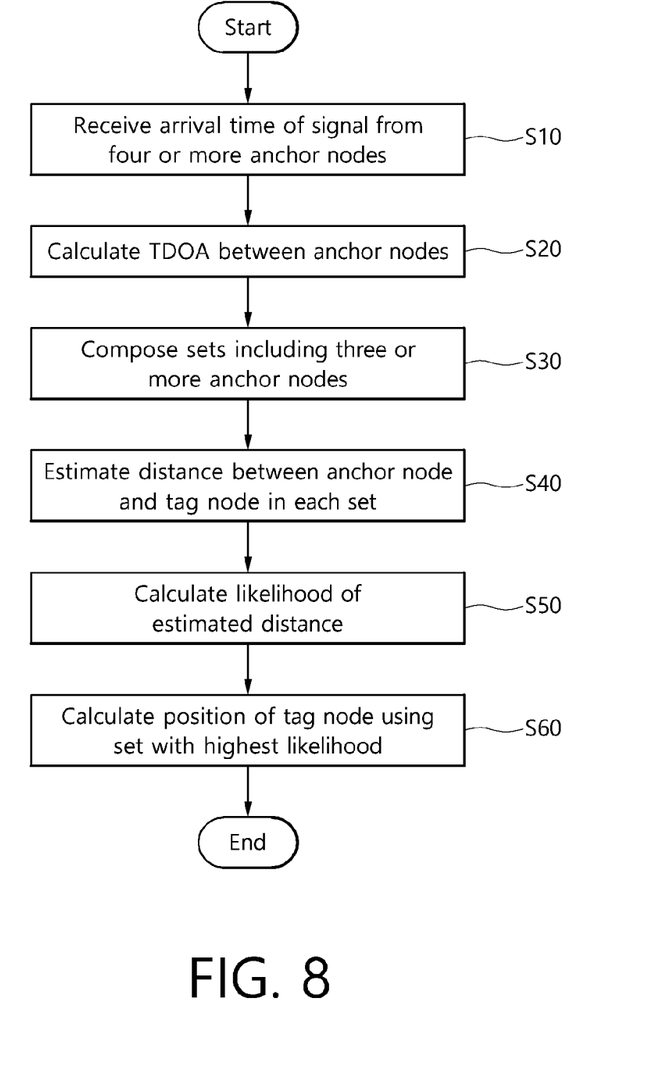
FIG. 8 is a flowchart of a TDOA wireless positioning method according to another exemplary embodiment of the present invention.

FIG. 8 is a flowchart of a TDOA method using destructive interference according to an embodiment of the present invention.

First, each arrival time of a signal transmitted by the tag node is received from four or more anchor nodes at step S10, and TDOA between each anchor node is calculated at step S20.

Since at least four anchor nodes are included, sets including three or more anchor nodes are composed at step S30.

Next, a distance between the anchor node and the tag node is respectively estimated using the above equations in each set at step S40.

A likelihood between the distance estimated in the above step and the distance obtained by positioning using TDOA is calculated at step S50, and estimating that a set with the highest likelihood is a set with the lowest error to the actual distance, a position of the tag node is calculated using anchor nodes of this set at step S60.

As described above, according to the present invention, even if there is an error in the TDOA value due to NLOS, there is an advantage in that it is possible to position the tag node more accurately than the existing method. Since separate hardware is not required to perform such a method, it is possible to obtain an effect of reducing the cost by reducing the size or weight of the tag node.

The scope of protection of the present invention is not limited to the description and expression of the embodiments explicitly described above. In addition, it is added once again that the scope of protection of the present invention may not be limited due to obvious changes or substitutions in the technical field of the present invention.

What is claimed is:

1. A server for TDOA wireless positioning using destructive interference, comprising:
    a transceiver to receive each reception time of a signal transmitted by a tag node from four or more anchor nodes; and
    a controller to calculate a position of the tag node using the signal and configured to:
        calculate TDOA (Time Difference of Arrival) between the anchor nodes using the received times,
        compose a set including three or more anchor nodes among the anchor nodes,
        estimate each distance between the tag node and the anchor nodes included in the set,
        calculate each distance between the tag node and the anchor nodes included in the set using TDOA calculated in the set,
        calculate a likelihood between the estimated distance and the calculated distance for the each set and calculate a position of the tag node using a set with the highest likelihood.

2. The server of claim 1, wherein the estimating each distance between the tag node and the anchor nodes included in the set uses the Chan algorithm.

3. The server of claim 1, wherein the estimating each distance between the tag node and the anchor nodes included in the set uses the Gauss-Newton method (iterative substitution method).

4. The server of claim 1, wherein the calculating the likelihood uses the Maximum Likelihood Estimation method.

5. A method for TDOA wireless positioning using destructive interference performed by a controller including one or more processors and memories, comprising:
    calculating TDOA between anchor nodes using respective time when four or more anchor nodes receives a signal transmitted by a tag node;
    composing a set including three or more anchor nodes among the anchor nodes;
    estimating each distance between the tag node and the anchor nodes included in the set;
    calculating each distance between the tag node and the anchor nodes included in the set using TDOA calculated in the set;
    calculating a likelihood between the estimated distance and the calculated distance for the each set; and
    calculating a position of the tag node using a set with the highest likelihood calculated.

6. The method of claim 5, wherein the estimating each distance between the tag node and the anchor nodes included in the set uses the Chan algorithm.

7. The method of claim 5, wherein the estimating each distance between the tag node and the anchor nodes included in the set uses the Gauss-Newton method (iterative substitution method).

8. The method of claim 5, wherein the calculating the likelihood uses the Maximum Likelihood Estimation method.

* * * * *